United States Patent
Yeralan et al.

(10) Patent No.: US 6,816,650 B2
(45) Date of Patent: Nov. 9, 2004

(54) PLANAR LIGHTWAVE FILTER DEVICE

(75) Inventors: Serdar Yeralan, Pleasanton, CA (US); John Edward Gunther, Morgan Hill, CA (US)

(73) Assignee: Hoya Corporation

(*) Notice: Subject to any disclaimer, the term of this patent is extended or adjusted under 35 U.S.C. 154(b) by 88 days.

(21) Appl. No.: 10/378,310

(22) Filed: Mar. 3, 2003

(65) Prior Publication Data

US 2003/0219204 A1 Nov. 27, 2003

Related U.S. Application Data

(60) Provisional application No. 60/362,496, filed on Mar. 6, 2002.

(51) Int. Cl.[7] .................................................. G02B 6/26
(52) U.S. Cl. ................................ 385/37; 385/10; 385/24
(58) Field of Search ............................... 385/24, 37, 39, 385/40, 10; 359/572; 398/84, 87; 372/20, 102

(56) References Cited

U.S. PATENT DOCUMENTS 6,567,573 B1 * 5/2003 Domash et al. ............... 385/16
2002/0176088 A1 * 11/2002 Johnson et al. ............. 356/477

* cited by examiner

Primary Examiner—Hemang Sanghavi

(57) ABSTRACT

The invention provides a method of processing an optical signal having a first amplitude frequency or gain frequency profile so as to produce a desired second amplitude frequency or gain frequency profile, the method comprising subjecting the signal to action by a plurality of chirped gratings each of which is designed to act upon a respective wavelength band of said signal and to remove at least a part of the radiation in said band and operating the gratings such that the proportion of the radiation removed from the respective band is such as to alter the first profile to the second profile within that band. The electrodes define a plurality of adjacent independently adjustable filter segments along the waveguide. Each filter segment functions over a specific range of wavelengths, where the center-to-center wavelength difference between adjacent segments and the wavelength bandwidth of each segment are defined in large part by the chirp in the grating. In a preferred embodiment of the invention, the grating is divided into two consecutive chirp regions, both of which span the desired wavelength band. The first chirp region is divided into a first group of independently adjustable filter segments. The second chirp region is divided into a second group of independently adjustable filter segments spaced such that the central wavelengths of the second group of filter segments are interleaved between the center wavelengths of the first group of filter segments a set of overlapping filter functions that can be used to create very smooth attenuation versus wavelength profiles.

5 Claims, 2 Drawing Sheets

PLANAR LIGHTWAVE FILTER DEVICE

RELATED APPLICATIONS

This application claims benefit of the filing date of U.S. Provisional Application No. 60/362,496, filed Mar. 6, 2002, entitled "Planar Lightwave Filter Device".

BACKGROUND OF THE INVENTION

This invention relates to a waveguide device for use in optical communication networks. Specifically, the present invention provides a method for dynamic gain equalization using at least two continuously chirped grating regions to provide overlapping attenuation notches There is a need for efficient, cost-effective means for controlling wavelength transmission in telecommunications devices especially for Wavelength Division Multiplexing (WDM). WDM utilizes an optical signal that comprises a plurality of discrete wavelength channels. It is important that the power of these channels remains uniform as the optical signal propagates, for example, from a transmitter through an optical fiber and other associated components to a receiver. Inadequate power levels at the receiver can decrease the signal to noise ratio of the system and cause communication errors. To compensate for losses in power that are inherent in the propagation path, it is necessary periodically to boost the individual channels by means of amplifiers placed at junction points. There are several way in which this amplification be achieved using electrical or optical methods. A preferred approach is to use optical amplifiers, such as Erbium-Doped Fiber Amplifiers, which exploit some quantum mechanical effect in a material to create gain in the material and consequent optical amplification of the input signal. Due to the non-linear nature of the gain characteristics of such amplifiers, the amplitude/frequency profile of the output signal will not be uniform, but may exhibit spectral ripple or other variations. Other effects, such as the amplification of spontaneous emission, can increase the bit error rate in individual wavelength channels. There are also other factors that may give rise to wavelength dependent losses and gain, such as absorption, scattering and non-linear fiber effects. Ideally, the output signal should not exhibit ripple but should have a flat profile across the spectrum of its operating bandwidth. The process of correcting these inequalities is referred to as spectral equalization (in the case of the amplitude/wavelength profile) or gain equalization (in the case of the gain/wavelength profile).

A dynamic gain equalization (DGE) device is a specific type of wavelength selective filter used in optical communications systems, typically to compensate for the wavelength-dependent gain variations in amplifiers. Ideally, the DGE should be capable of providing any arbitrary attenuation versus wavelength characteristic. Realistic DGEs are limited by a maximum possible range of attenuation, and by finite wavelength resolution.

Ideally, the output signal should not exhibit ripples but should have a flat profile across the spectrum of its operating bandwidth. Two established methods for implementing spectral or gain equalization are by means of individual channel equalization and by Fourier filtering. In the first technique the individual wavelength channels are separated or de-multiplexed and the power of each channel is separately adjusted using for example liquid crystal devices, following which the channels are recombined or multiplexed. However, such techniques suffer from the problems of insertion loss, polarization dependent loss, dispersion and high cost.

Fourier filtering approaches involve splitting the desired filter profile into a number of frequency components by means of Fourier analysis. The individual frequency components are then adjusted independently of the actual number of channels. There are only a limited number of technologies that enable Fourier filtering. These include Mach-Zehnder based thermo-optic devices and acousto-optic tunable Bragg filters. Mach-Zehnder devices suffer from the problems of heat dissipation and speed, while acousto-optic devices require high power RF signals and carry a significant cost and noise overhead. This approach also suffers from the problems inherent in attempting to synthesize arbitrary spectral profiles from a finite set of filters by a process of Fourier analysis. This results in residual ripple and other non-uniformities.

Domash, in U.S. Pat. No. 5,937,115 describes a family of electro-optical components comprised of an optical waveguide fabricated on, or just under, the surface of a waveguide substrate, a layer of polymer dispersed liquid crystal material (PDLC) in which a Bragg grating has been formed, and a cover plate. One or both of the waveguide substrate and cover plate support electrodes, typically transparent indium tin oxide films, for applying an electric field across the PDLC layer. The Bragg grating is formed in the PDLC layer by first filling the space between the waveguide substrate and cover plate with a liquid mixture of photopolymerizable monomers and liquid crystal material. The liquid material is then illuminated with two mutually coherent laser beams, which interfere to form the desired grating structure. During the recording process, the monomers polymerize and the PDLC mixture undergoes a phase separation, creating regions densely populated by liquid crystal microdroplets, interspersed with regions of clear polymer. The alternating liquid crystal-rich and liquid crystal-depleted regions form the fringe planes of the grating. When an electric field is applied, the natural orientation of the LC droplets is changed causing the average refractive index and the refractive index modulation of the grating to change. Such components, commonly termed Electrically Switchable Bragg Grating (ESBG) devices are useful as wavelength-selective filters and attenuators in fiber optic communications systems.

U.S. Pat. No. 5,942,157 by Sutherland et al. and U.S. Pat. No. 5,751,452 by Tanaka et al. describe monomer and liquid crystal material combinations suitable for fabricating ESBG devices. A recent publication by Butler et al. ("Diffractive properties of highly birefringent volume gratings: investigation", Journal of the Optical Society of America B, Vol. 19 No. 2, February 2002) describes analytical methods for designing ESBG devices and provides references to publications describing the fabrication and application of ESBG devices.

Ashmead (WDM Solutions, January 2001) described a dynamic gain equalization device comprising a series of Electrically Switchable Bragg Grating (ESBG), each with a different peak wavelength, constructed in series along a planar optical circuit with a single waveguide core.

The object of the present invention is to obviate some of the limitations of the prior art by providing a more optically efficient and cost effective way of synthesizing arbitrary spectral profiles that minimize the problems of ripple and other uniformity variations.

SUMMARY OF THE INVENTION

The invention provides a method of filtering an optical signal having a first amplitude frequency or gain frequency profile so as to produce a desired second amplitude frequency or gain frequency profile. Specifically, the method comprises subjecting the signal to action by a plurality of diffraction devices each of which is designed to act upon a respective wavelength band of said signal. Each of said plurality of diffraction devices is controlled to remove at least a part of the radiation in its respective band, such that the combined action of said plurality of diffraction devices is to alter the first profile to the second profile. Advantageously, the proportion of radiation removed by each diffraction device is independently variable such that a wide variety of filter characteristics can be achieved.

The unique features of the invention as compared to the prior art are, first, the grating is fabricated with a continuous chirp, or variation in fringe pitch, along the axis of the waveguide; and, second, the electrodes define a plurality of adjacent independently adjustable filter segments along the waveguide. Each filter segment functions over a specific range of wavelengths, where the center-to-center wavelength difference between adjacent segments and the wavelength bandwidth of each segment are defined in large part by the chirp in the grating.

In a first embodiment of the invention the grating is divided into a group of independently adjustable filter segments each segment having a unique bandwidth and center wavelength, covering the desired wavelength band.

In a preferred embodiment of the invention, the grating is divided into two consecutive chirp regions, both of which span the desired wavelength band. The first chirp region is divided into a first group of independently adjustable filter segments. The second chirp region is divided into a second group of independently adjustable filter segments spaced such that the central wavelengths of the second group of filter segments are interleaved between the center wavelengths of the first group of filter segments. The benefit of this configuration is that it provides a set of overlapping filters functions that can be used to create very smooth attenuation versus wavelength profiles.

A more complete understanding of the invention can be obtained by considering the following detailed description in conjunction with the accompanying drawings, wherein like index numerals indicate like parts. For purposes of clarity, details relating to technical material that is known in the technical fields related to the invention have not been described in detail.

DETAILED DESCRIPTION OF THE INVENTION

Figure 1:
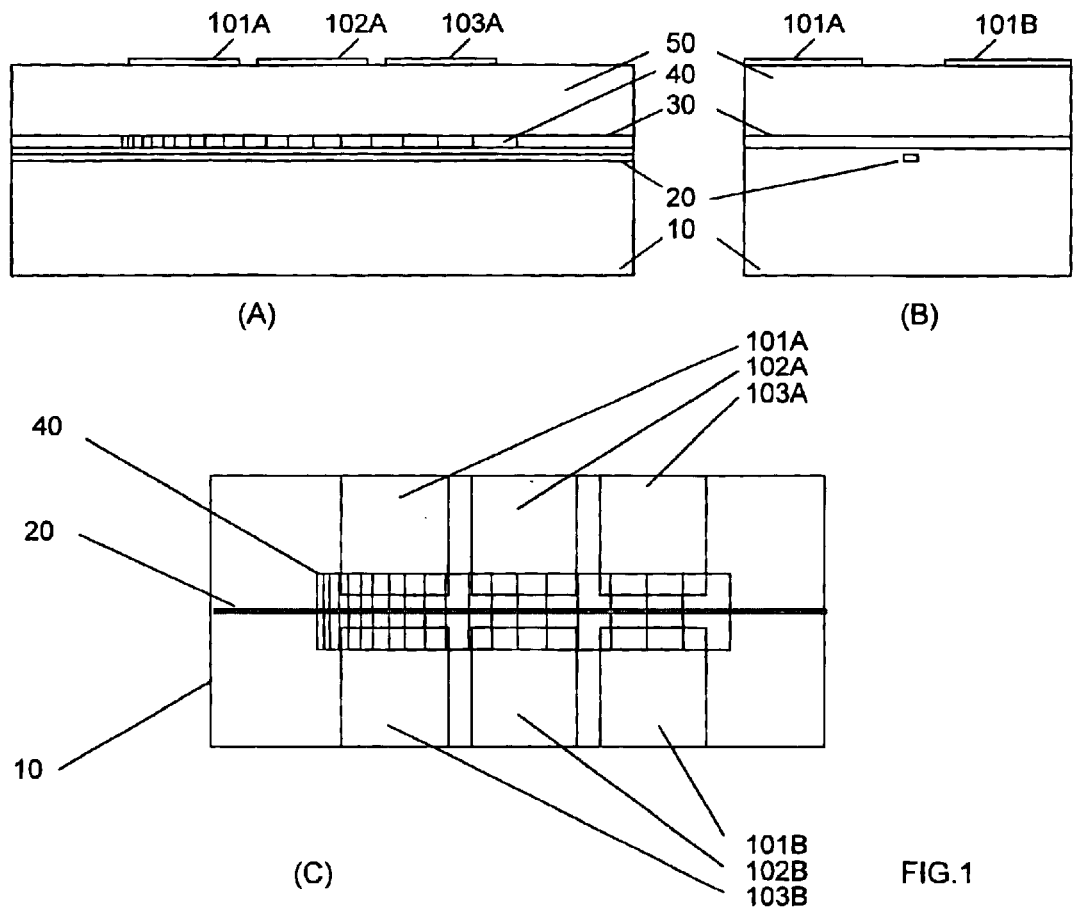
FIGS. 1A to 1C are side, cross-section and top schematic views respectively of a first embodiment of the present invention.

Referring to FIGS. 1A to 1C, the device comprises a substrate 10, an optical waveguide core 20 formed in substrate 10, an active cladding layer 30 containing a chirped Bragg grating 40 disposed in proximity to the waveguide core, a cover glass 50 in contact with the active cladding layer 30 and three pairs of electrodes 101A and 101B, 102A and 102B, 103A and 103B, each pair counter opposed across the waveguide. It should be emphasized that FIGS. 1A to 1C are exemplary and real DGE devices will have substantial greater number of electrodes. The cover glass and the full extent of the active cladding layer are not shown in FIG. 1C and the grating fringe pitch and rate of change of pitch are greatly exaggerated for clarity.

The electrodes may be formed as thin films on either the waveguide substrate or the cover glass. Other electrode configurations are possible and have been described in a co-pending patent application PCT/GB2002/003530 entitled "Optical Device" filed on Jul. 31, 2002.

The active cladding layer must be in optical contact with the waveguide, where optical contact is herein defined to mean that at least a portion of the mode field of the light propagating in the waveguide core overlaps the active cladding layer. The optical waveguide may be totally immersed in the substrate as shown in FIG. 1A and FIG. 1B or, alternatively, may have at least part of the core in direct contact with the active cladding layer. However, in order that optical waves may be confined to the core, the optical refractive index of the core must be higher than that of the substrate and of the active cladding layer where the active cladding is in contact with the core. The substrate 10 would typically be fabricated from silicon coated with a thick layer of oxide, but could also be a transparent material, such as fused silica, having an appropriate refractive index. The waveguide may have a rectangular cross-section as shown in FIG. 1B or alternatively may have a circular or other cross section.

The input to and output from the device are light signals coupled to the ends of the waveguide core. The most common method of coupling these signals would be to align and bond optical fibers to the ends of the core.

In the preferred embodiments of the invention the grating is a Bragg grating fabricated in a holographic polymer dispersed liquid crystal (HPDLC) layer. Typically, the means for making the Bragg grating is to first fill the space between the planar lightwave circuit and the cover plate with a liquid mixture of liquid crystal material and photopolymerisable monomers, and then use two-beam holographic recording techniques to selectively polymerize the monomer. The end result is a grating comprised of alternating planes of liquid crystal rich material and liquid crystal deficient material. In a preferred configuration of the invention, Bragg grating is formed with fringe planes normal to the axis of the waveguide. In addition, the Bragg grating is formed with a continuously changing fringe pitch, or chirp, along the length of the waveguide. The techniques for forming chirped gratings are well known to those skilled in the art.

The polymer and liquid crystal materials used in PDLC devices are commonly selected such that the ordinary index of the liquid crystal material is essentially the same as the index of the polymer-rich regions. For ESBG devices, the materials are further chosen to ensure that, in the absence of an electric field, the liquid crystal molecules within the liquid crystal rich regions of the grating naturally align with their extraordinary axis normal to the grating fringe planes. Suitable materials are well known in the art.

With the molecules aligned as described above, the extraordinary axis of the liquid crystal molecules are parallel to the axis of the waveguide and the gratings will have essentially no interaction with the light propagating in the waveguide. The cover glass, waveguide circuit substrate, or both have thin film electrodes for imposing an electric field to control the ESBGs. The application of an electric field normal to the axis of the waveguide cores will cause the liquid crystal molecules to rotate in the direction of the field, thus increasing the interaction between the grating and the light propagating in the waveguides.

A voltage applied between the two members of any pair of electrodes will create an electric field transverse to the waveguide axis, and thus cause rotation of the liquid crystal molecules and corresponding change in the grating index modulation. The increase in the grating index modulation will cause light to couple from the waveguide to reflected and radiating modes such that the light traveling in waveguide core is attenuated over the wavelength band defined by the grating. In this embodiment of FIGS. 1A to 1C, a voltage applied to electrode pair 101A and 101B will cause attenuation in the short wavelength portion of the spectrum of interest. Similarly, a voltage applied to electrode pair 102A and 102B or 103A and 103B will cause attenuation in the middle or long wavelength portion of the spectrum, respectively. Thus each electrode pair defines a unique filter segment in the chirped grating. The attenuation of the three filter segments is independently controlled by the voltages applied to the three electrode pairs.

Figure 3:
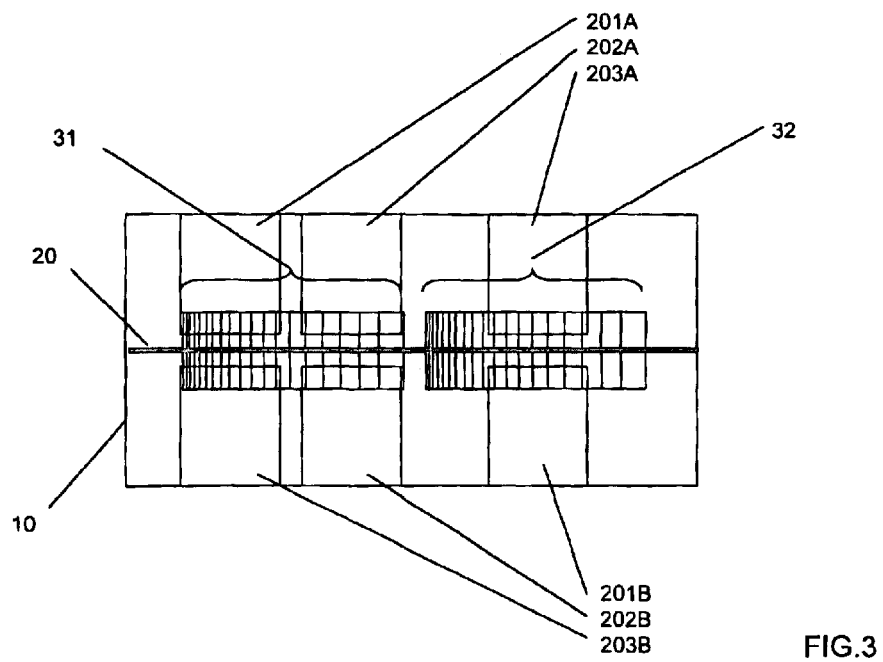
FIG. 3 is a top schematic view of a second embodiment of the invention.

The attenuation versus wavelength characteristic of this exemplary device is shown in FIG. 3. It should be understood that the plots are based on simulated data, rather than experimental data and that the attenuation curves shown are the hypothetical maximums, which may be adjusted by means of the voltages applied to the electrode pairs.

The center-to-center wavelength spacing of the three attenuation peaks is determined solely by the chirp incorporated into the grating. Specifically, if the resonance wavelength of the grating changes at a rate of C nanometers/millimeter of grating length, the center-to-center wavelength spacing of the attenuation peaks will be given by CX nanometers, where X millimeters is the physical center-to-center spacing of the electrode pairs.

Figure 2:
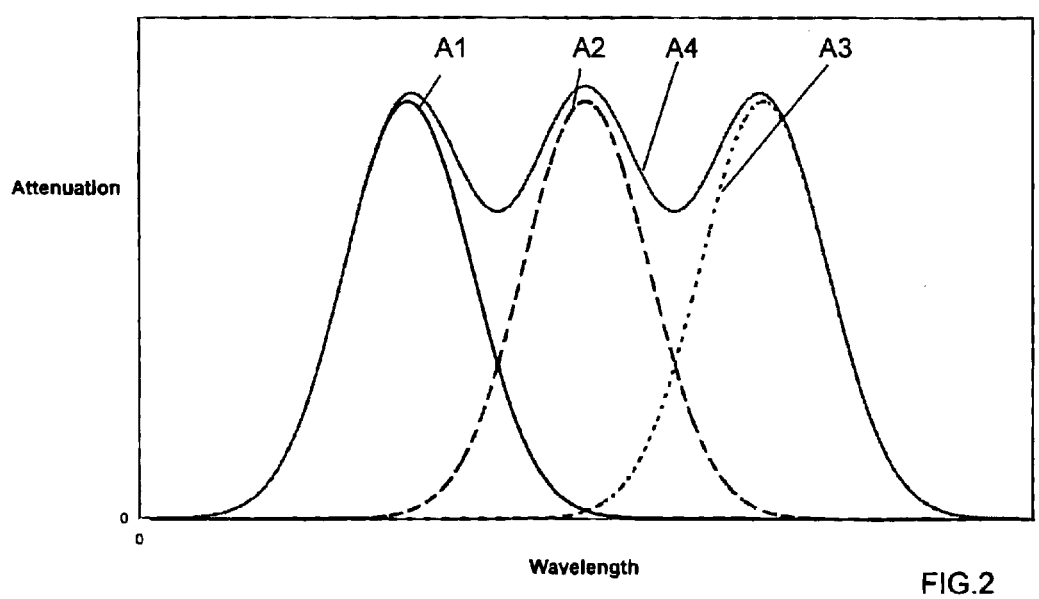
FIG. 2 is a chart illustrating the attenuation characteristics of the device of FIGS. 1A to 1C.

The wavelength bandwidth of the attenuation peaks is also highly dependent on the grating chirp rate, but is also affected by the grating material characteristics and the electrode shape. The inventors' investigations have revealed that the bandwidth of the attenuation (FWHM in dB) is typically slightly less than the center-to-center spacing. In this case, the combined attenuation of multiple peaks does not provide a flat, uniform attenuation versus wavelength characteristic, but rather has some variation in attenuation, or ripple. FIG. 3 shows typical attenuation characteristics of the exemplary device in FIG. 2. In FIG. 3, the attenuation profile provided by the filter segments defined by electrode pair 101A and 101B is indicated by the curve A1. Similarly, the attenuation profile provided by filter segment defined by electrode pair 102A and 102B is indicated by the curve A2, and the attenuation profile provided by the filter segment defined by electrode pair 103A and 103B is indicated by the curve A3. The ripple is clearly visible in curve A4, which shows the combined effect of the three filter segments. The amount of ripple is determined by the number of peaks within a given wavelength band of interest.

FIG. 3 shows a second embodiment of the present invention, which is similar in many respects to the embodiment shown in FIG. 1 and therefore similar parts are accorded the same reference numerals. In FIG. 3, the grating has been divided into two regions, each of which has a chirp that spans the entire wavelength band of interest. Each of these regions has associated electrodes to create electric fields across the grating material. In FIG. 3, the first grating region has two pairs of electrodes and the second grating region has one pair of electrodes. As was the case with FIG. 1, FIG. 3 is exemplary and real DGE devices will have substantial greater number of electrodes. The cover glass and the full extent of the cladding layer are not shown in FIG. 3 and the grating fringe pitch and rate of change of pitch are greatly exaggerated for clarity.

The embodiment shown in FIG. 3 differs from the embodiment shown in FIG. 1 in two key respects. Firstly, the chirp rate in each of the two grating regions in FIG. 3 is twice that of the single grating of FIG. 1. Hence according to the well known principles of grating theory, the resulting center-to-center wavelength spacing and bandwidth of the attenuation notches created by each section of FIG. 3 will be twice that of the embodiment of FIG. 1. Secondly, the electrodes in FIG. 3 are arranged such that the attenuation peaks of the wavelength spectra formed by the filter segments in the first grating regions are interleaved with the attenuation peaks of the wavelength spectra formed by the filter segments in the second grating region.

Figure 4:
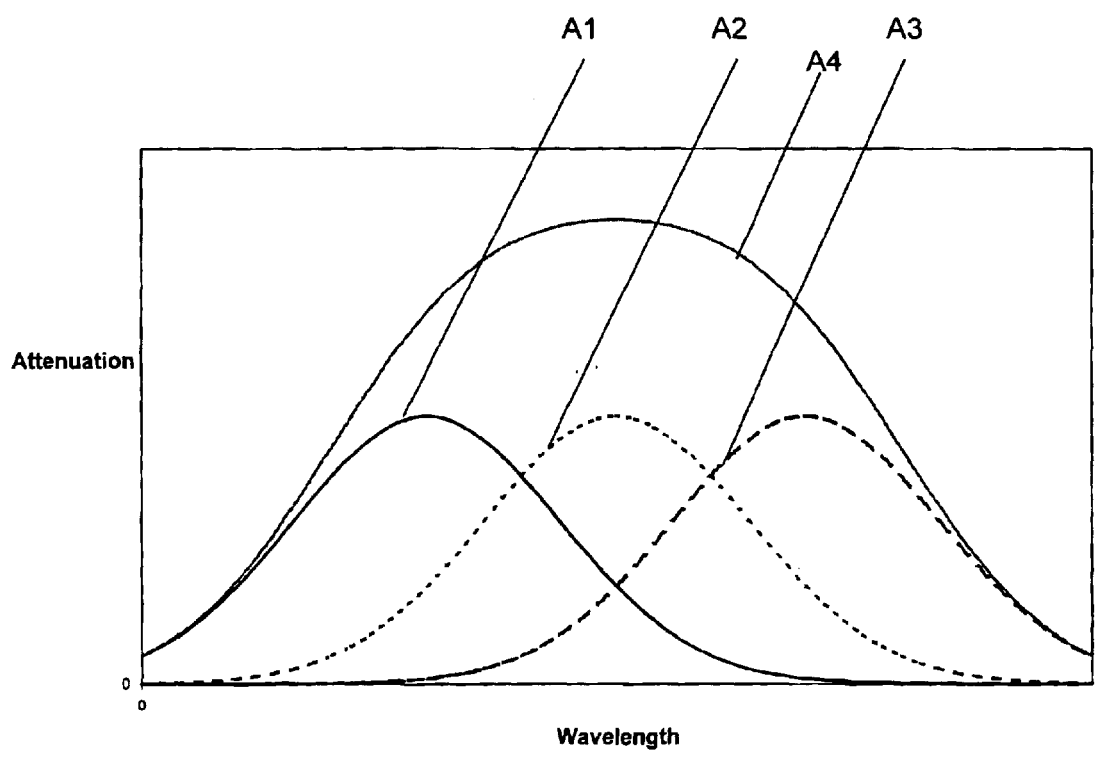
FIG. 4 is a chart illustrating the attenuation characteristic of the device of FIG. 3.

The benefit of this second embodiment of the invention is that the wider, interleaved, attenuation peaks can be combined to produce flat broadband attenuation without ripples. FIG. 4 shows typical attenuation characteristics of the embodiment of FIG. 3. In FIG. 4, the attenuation profile provided by filter segment defined by electrode pair 201A and 201B is indicated by the curve B1. Similarly, the attenuation profile provided by the filter segment defined by electrode pair 202A and 202B is indicated by the curve B2, and the attenuation profile provided by the filter segment defined by electrode pair 203A and 203B is indicated by the curve B3. The combined attenuation provided by the three filter segments is indicated by the curve B4.

Whereas the invention has been described in relation to what are presently considered to be the most practical and preferred embodiments, it will be apparent to those skilled in the art that the invention is not limited to the disclosed arrangements, but rather is intended to cover various modifications and equivalent construction included within the spirit and scope of the invention. For example, although the invention has particular applicability to the optical telecommunications field, it can be used in any application, such as fiber optical sensors, where it may be necessary to correct for non-uniformities in the power spectrum of an optical signal.

Although the discussion of invention has been confined to reconfiguring the light in a single waveguide, it will be clear that the invention could also be applied to more complex optical waveguide circuits contain several waveguide cores and more specifically to configurations containing several parallel waveguides.

In further embodiments of the basic invention more than two gratings could be used to provide greater control over the output wavelength spectrum.

In one embodiment the diffraction devices are operative such that the output profile is substantially flat. In an alternative embodiment the diffraction devices are operative such that the output profile is substantially of constant slope.

What is claimed is:

1. A component for selectively filtering a guided light beam comprising:

an optical waveguide having an input port for receiving an input light signal and an output port for outputting the filtered light signal;

at least one grating in optical contact with said waveguide, each said grating having a continuous chirp parallel to axis of said waveguide;

a plurality of electrodes disposed along each said grating for selectively applying a field to adjacent sections of each said grating, said electrodes defining a plurality of independently adjustable filter segments, wherein each said filter segment is operative to attenuate at least a portion of said input light signal, under the action of said field, each said portion of light characterized by a unique bandwidth and peak attenuation wavelength.

2. A component as claimed in claim 1 wherein there is at least a first grating and a second grating, both said gratings in optical contact with said waveguide, and said electrodes are configured such that the attenuation peaks of the wavelength spectra formed by filter segments in said first grating are interleaved with the attenuation peaks of the wavelength spectra formed by filter segments in said second grating.

3. A component as claimed in claim 1 wherein said at least one grating is an Electrically Switchable Bragg Grating (ESBG).

4. A Dynamic Gain Equalizer comprising:

an optical waveguide having an input port for receiving an input light signal;

a first ESBG and an adjacent second ESBG in optical contact with said waveguide, each said ESBG having a continuous variation in pitch parallel to axis of said waveguide; and a plurality of electrodes disposed along each said ESBG for selectively applying a field to adjacent sections of each said grating, said electrodes defining a plurality of independently adjustable filter segments, each said filter segment being operative to remove at least a portion of said input light signal, under the action of said field, each said portion of light characterized by a unique bandwidth and peak attenuation wavelength, wherein electrodes are arranged such that the attenuation peaks of the wavelength spectra formed by the filter segments said first ESBG are interleaved with the attenuation peaks of the wavelength spectra formed by second filter segments in said second ESBG.

5. A method of selectively reconfiguring a wavelength spectrum of a light beam comprising the steps of:

providing a input light having an initial spectral profile;

diffracting light out of said light beam in time sequence from a first plurality of wavelength bands, said wavelength bands each having unique peak wavelengths;

diffracting light out of said light beam in time sequence from a second plurality of wavelength bands, said second plurality of wavelength bands having peak wavelengths interleaved with the peak wavelengths of the first plurality of wavelength bandwidths; and outputting a light beam with a modified spectral profile.

* * * * *